(12) United States Patent
Deng et al.

(10) Patent No.: US 11,556,100 B2
(45) Date of Patent: Jan. 17, 2023

(54) CONTROL METHOD, RELATED DEVICE, AND SYSTEM

(71) Applicant: HUAWEI TECHNOLOGIES CO., LTD., Shenzhen (CN)

(72) Inventors: Xiaotao Deng, Nanjing (CN); Qing Luo, Nanjing (CN); Zhifeng Chen, Nanjing (CN); Tao Han, Nanjing (CN); Junfei Zeng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 393 days.

(21) Appl. No.: 16/730,060

(22) Filed: Dec. 30, 2019

(65) Prior Publication Data
US 2020/0133217 A1 Apr. 30, 2020

Related U.S. Application Data

(63) Continuation of application No. PCT/CN2018/076745, filed on Feb. 13, 2018.

(30) Foreign Application Priority Data

Jun. 30, 2017 (CN) .......................... 201710526866.X

(51) Int. Cl.
G05B 17/02 (2006.01)
H04L 67/12 (2022.01)
H04L 41/14 (2022.01)

(52) U.S. Cl.
CPC ............ *G05B 17/02* (2013.01); *H04L 41/145* (2013.01); *H04L 67/12* (2013.01)

(58) Field of Classification Search
CPC ............. H04L 63/1416; H04L 63/1433; H04L 63/1441; H04L 63/1425; H04L 63/20;
(Continued)

(56) References Cited

U.S. PATENT DOCUMENTS 9,769,089 B2 * 9/2017 Tan ...................... H04W 76/12
2005/0114493 A1 5/2005 Mandato et al.
(Continued)

FOREIGN PATENT DOCUMENTS

CN 1316805 C 5/2007
CN 101782768 A 7/2010
(Continued)

OTHER PUBLICATIONS

Chinese Notice of Allowance issued in corresponding Chinese Application No. 201710526866.X, dated Aug. 19, 2021, pp. 1-4.
(Continued)

*Primary Examiner* — Tonia L Dollinger
*Assistant Examiner* — Linh T. Nguyen
(74) *Attorney, Agent, or Firm* — Hauptman Ham, LLP

(57) ABSTRACT

A control method includes sending, by a controller, a created context-aware model to a context-aware engine. The context-aware model is used to define a preset control performed when target data meets a trigger condition and to instruct the context-aware engine to send indication information to the controller when the context-aware engine determines that the target data meets the trigger condition. The preset control is used to implement a context-aware function. The indication information is used to indicate that the target data meets the trigger condition. The method also includes receiving, by the controller, the indication information. The method further includes performing, by the controller, the preset control based on the indication information.

20 Claims, 6 Drawing Sheets

(58) Field of Classification Search
CPC ............... H04L 63/145; H04L 63/1466; H04L 63/1475; H04L 63/1837; H04L 63/302; H04L 43/026; H04L 43/062; H04L 43/16; H04L 47/2483; H04L 63/145; H04L 63/1483; H04L 67/12; H04L 69/22
See application file for complete search history.

(56) References Cited

U.S. PATENT DOCUMENTS

| | | |
|---|---|---|
| 2009/0037430 A1 | 2/2009 | Mukkamala et al. |
| 2009/0240647 A1 | 9/2009 | Green et al. |
| 2009/0316594 A1 | 12/2009 | Kim et al. |
| 2013/0254833 A1 | 9/2013 | Nicodemus et al. |
| 2015/0379163 A1* | 12/2015 | Wang .................. G06T 19/20 703/1 |
| 2016/0036643 A1* | 2/2016 | Nair ...................... H04L 49/35 370/255 |
| 2016/0043927 A1* | 2/2016 | Larson .................. H04L 45/02 370/389 |
| 2016/0062745 A1 | 3/2016 | Rao et al. |
| 2016/0105531 A1* | 4/2016 | Godfrey ................ H04W 4/70 709/224 |
| 2017/0063930 A1* | 3/2017 | Chesla ................. H04L 63/1425 |
| 2017/0149640 A1* | 5/2017 | Narayanan ........... H04L 43/062 |
| 2018/0006833 A1* | 1/2018 | Tatlicioglu .......... H04L 41/0859 |
| 2018/0234435 A1* | 8/2018 | Cohen ................. H04L 63/1416 |
| 2019/0373301 A1* | 12/2019 | Gunasekara ..... H04N 21/47202 |

FOREIGN PATENT DOCUMENTS

| | | |
|---|---|---|
| CN | 102037481 A | 4/2011 |
| CN | 102915518 A | 2/2013 |
| CN | 103595657 A | 2/2014 |
| CN | 103890812 A | 6/2014 |
| CN | 104156897 A | 11/2014 |
| CN | 104486416 A | 4/2015 |
| CN | 104579873 A | 4/2015 |
| CN | 104885427 A | 9/2015 |
| CN | 105227572 A | 1/2016 |
| CN | 105320082 A | 2/2016 |
| CN | 105812461 A | 7/2016 |
| EP | 1396986 A2 | 3/2004 |
| WO | 2007066887 A1 | 6/2007 |
| WO | 2013029233 A1 | 3/2013 |
| WO | 2014088912 A1 | 6/2014 |

OTHER PUBLICATIONS

Second Chinese Office Action issued in corresponding Chinese Application No. 201710526866.X, dated Sep. 10, 2020, State Intellectual Property Office of the P.R. China, Beijing, China.
International search report dated Apr. 27, 2018 from corresponding application No. PCT/CN2018/076745.
Extended European search report dated Mar. 11, 2020 from corresponding application No. EP 18824127.7.
Office Action dated Mar. 4, 2020 from corresponding application No. CN 201710526866.X.

* cited by examiner

CONTROL METHOD, RELATED DEVICE, AND SYSTEM

CROSS-REFERENCE TO RELATED APPLICATIONS

This application is a continuation of International Application No. PCT/CN2018/076745, filed on Feb. 13, 2018, which claims priority to Chinese Patent Application No. 201710526866.X, filed on Jun. 30, 2017. The disclosures of the aforementioned applications are hereby incorporated by reference in their entireties.

TECHNICAL FIELD

This application relates to the field of communications technologies, and in particular, to a control method, a device, and a system.

BACKGROUND

With rapid development of the mobile internet, an increasingly high requirement is imposed on network intelligence. To implement intelligent control on a network, as shown in FIG. 1, a commonly used communications system is provided. The system includes a network device 101, a mobile device 103, a sensor 104, and a sensor signal processor 102.

A specific process of performing intelligent control by the communications system shown in FIG. 1 includes: The sensor 104 is embedded in the mobile device 103. The sensor 104 can collect sensor information, where the sensor information includes time information, location information, and the like. The mobile device 103 obtains the sensor information collected by the sensor 104 and sends the sensor information to the sensor signal processor 102. The sensor signal processor 102 determines the sensor information collected by the sensor 104, to generate a corresponding instruction based on a determining result, and sends the instruction to the network device 101. The network device 101 having a data forwarding and control capability can perform intelligent control on the communications system after analyzing the sensor information according to the instruction.

However, in the foregoing intelligent control process, the mobile device 103 needs to drive the network device 101. Specifically, the sensor 104 installed in the mobile device 103 drives the network device 101 by using the sensor information. The communications system cannot provide a proactive service or adaptively change based on a context, and the network device 101 integrates control and forwarding. Consequently, a network control capability is limited, and an entire network cannot be globally and intelligently controlled.

SUMMARY

This application provides a control method, a related device, and a system, so that the system has a context-aware capability, and capability of intelligent control on a network is effectively improved.

A first aspect provides a control method, including the following steps.

Step A. A controller creates a context-aware model.

The context-aware model is used to define preset control performed when target data meets a trigger condition, where the preset control is used to implement a context-aware function.

The controller may exchange information with an external device to create the context-aware model, where the external device may be a network device, a network service device, a mobile device, a wireless sensor, a wearable device, or the like. A sensor control interface configured to exchange information with the external device is disposed in the controller. The controller may receive, by using the sensor control interface, information sent by the external device, and configure the context-aware model based on the information sent by the external device.

Step B. The controller sends the created context-aware model to a context-aware engine.

The context-aware model is further used to instruct the context-aware engine to determine whether the target data meets the trigger condition, and if yes, the context-aware engine sends indication information to the controller, where the indication information is used to indicate that the target data meets the trigger condition.

Step C. The controller receives the indication information.

When the controller receives the indication information, the controller can determine that the target data meets the trigger condition, and can determine, based on the stored context-aware model, the preset control defined by the context-aware model.

Step D. The controller performs the preset control based on the indication information.

A specific manner of the preset control is not limited. For example, the controller may control network layer forwarding, a network status, network connectivity, a network device, a device connection, device management, a device protocol, and the like, provided that the context-aware function can be implemented.

The context-aware model created by the controller defines the target data that needs to be obtained, the trigger condition, and the preset control, so that the controller can perform the preset control when the controller determines that the target data meets the trigger condition. When performing the preset control, the controller can provide a proactive service based on the context-aware model. In addition, when the control method in this embodiment is applied to different scenarios, the controller may configure different context-aware models, so that the controller can control a network to implement different context-aware capabilities, thereby extending an application range of intelligent network control.

According to the foregoing control method, the controller performs network control, and the context-aware engine obtains and forwards the target data, so that the controller performs centralized network control, to obtain a global intelligent control capability. In addition, the context-aware engine processes data, thereby improving efficiency of performing context-aware control by the controller.

In a possible implementation, step A |[MS1]includes:

determining, by the controller, characteristic information used to implement a context-aware function, and setting, through text modeling, the characteristic information in the context-aware model, to create the context-aware model.

Therefore, the controller can define the target data by using the characteristic information, so that the context-aware engine can obtain, based on the characteristic information included in the context-aware model, the target data that meets the trigger condition defined by the context-aware model.

In a possible implementation, step A includes:

creating, by the controller, a type set based on abstract entity modeling, where the type set includes at least one network entity, and all network entities in a same type set have a same network entity type.

The network entity in this application may be a general name of various devices in a context-aware system, such as a node device, a communications device, a terminal device, a storage device, and other hardware devices.

The controller can determine network entity type definition information, where the network entity type definition information is used to define a type of a network entity, so that the controller can set, in the context-aware model, the network entity type definition information that is used as the characteristic information.

When the network entity type definition information has been set in the context-aware model created by the controller, the context-aware engine may collect the target data from a target device based on the context-aware model, where a device type of the target device is consistent with a type defined by the network entity type definition information.

In a possible implementation, step A includes:
performing, by the controller, modeling based on an attribute of a network entity, and determining, by the controller, network entity function definition information, where the network entity function definition information is used to define a function of the network entity, In this way, the controller can set the network entity function definition information as the characteristic information in the context-aware model, so that the context-aware engine collects the target data from the target device, where a function of the target device in this embodiment is consistent with a function defined by the network entity function definition information.

In a possible implementation, step A includes:
determining, by the controller, data attribute definition information used to define a data type, and setting, the data attribute definition information as the characteristic information in the context-aware model, so that the context-aware engine determines, based on the context-aware model in which the data attribute definition information is set, a data type of the collected target data is consistent with the data type defined by the data attribute definition information.

In a possible implementation, step A includes:
determining, by the controller, interface definition information, where the interface definition information is used to define a data interface, and the interface definition information is used to define a protocol for collecting the target data. In this way, the controller can set, in the context-aware model, the interface definition information that is used as the characteristic information, so that the context-aware engine obtains the target data based on the interface definition information.

In a possible implementation, step A includes:
determining, by the controller, measurement definition information, where the measurement definition information is used to define a data measurement unit, and setting the determined measurement definition information as the characteristic information in the context-aware model, so that a measurement unit of the target data collected by the context-aware engine is consistent with the data measurement unit defined by the measurement definition information.

In a possible implementation, step A includes:
determining, by the controller, data threshold information, where the data threshold information is used to define a value range of the target data. In this way, the controller can set, in the context-aware model, the data threshold information that is used as the characteristic information, so that a data range of the target data collected by the context-aware engine is consistent with the data range defined by the data threshold information.

In a possible implementation, step A includes:
determining, by the controller, data precision information, where the data precision information is used to define precision of the target data. In this way, the controller can set, in the context-aware model, the data precision information that is used as the characteristic information, so that precision of the target data collected by the context-aware engine is consistent with the data precision defined by the data precision information.

In a possible implementation, step A includes:
determining, by the controller, frequency definition information, where the frequency definition information is used to define frequency of collecting the target data. In this way, the controller can set, in the context-aware model, the frequency definition information that is used as the characteristic information, so that the context-aware engine collects the target data based on the frequency defined by the frequency definition information.

In a possible implementation, step D includes:
performing, by the controller, the preset control by using application configuration information and/or a network control constraint.

A second aspect provides a control method, including the following steps.

Step E. A context-aware engine receives a context-aware model.

The context-aware model is used to instruct the context-aware engine to obtain target data defined by the context-aware model.

A northbound sensor control interface is disposed in the context-aware engine, and the context-aware engine exchanges data with the controller through the northbound sensor control interface.

The context-aware engine receives the context-aware model through the northbound sensor control interface.

Step F. The context-aware engine obtains the target data.
The context-aware engine obtains the target data based on various characteristic information included in the context-aware model.

Step G. The context-aware engine determines whether the target data meets a trigger condition, and if yes, performs step H.

The context-aware model includes the trigger condition, and the context-aware model determines, based on an indication of the context-aware model, whether the target data meets the trigger condition, and if yes, the context-aware model may generate indication information. In this way, the context-aware engine can indicate, to the controller by using the indication information, that the target data meets the trigger condition.

Step H. The context-aware engine sends the indication information to the controller.

When receiving the indication information, the controller may determine that the target data meets the trigger condition. In this way, the controller can perform preset control defined by the context-aware model.

The context-aware engine in this application may obtain the target data based on the context-aware model, determine whether the target data meets the trigger condition defined by the context-aware model, and send, to the controller, the indication information used to indicate that the target data meets the trigger condition, so that the controller performs the preset control defined by the context-aware model.
|[MS2]In the control method provided in this application, the context-aware engine obtains and forwards the target data, so that the controller performs centralized network control, to obtain a global intelligent control capability. In addition, the context-aware engine processes data, thereby improving efficiency of performing context-aware control by the controller.

In a possible implementation, in step E, the context-aware engine may parse the context-aware model to read the characteristic information included in the context-aware model. After parsing out the characteristic information included in the context-aware model, the context-aware engine may collect the target data based on the characteristic information included in the context-aware model.

In a possible implementation, step F includes:
when the characteristic information included in the context-aware model is network entity type definition information, determining, by the context-aware engine based on the network entity type definition information, a target device configured to obtain the target data, where a device type of the target device is consistent with a type defined by the network entity type definition information.

In a possible implementation, step F includes:
when the characteristic information included in the context-aware model is network entity function definition information, determining, by the context-aware engine based on the network entity function definition information, a function of the target device configured to obtain the target data, where the function of the target device is consistent with a function defined by the network entity function definition information.

In a possible implementation, step F includes:
when the characteristic information included in the context-aware model is data attribute definition information, collecting, by the context-aware engine, the target data from the target device based on the data attribute definition information, where a data type of the collected target data is consistent with a data type defined by the data attribute definition information.

In a possible implementation, step F includes:
when the characteristic information included in the context-aware model is interface definition information, collecting, by the context-aware engine, the target data based on an interface defined by the interface definition information.

In a possible implementation, step F includes:
when the characteristic information included in the context-aware model is measurement definition information, collecting, by the context-aware engine, the target data based on the measurement definition information, so that a measurement unit of the target data collected by the context-aware engine is consistent with a data measurement unit defined by the measurement definition information.

In a possible implementation, step F includes:
when the characteristic information included in the context-aware model is data threshold information, collecting, by the context-aware engine, the target data based on the data threshold information, so that a data range of the target data collected by the context-aware engine is consistent with a data range defined by the data threshold information.

In a possible implementation, step F includes:
when the characteristic information included in the context-aware model is data precision information, collecting, by the context-aware engine, the target data based on the data precision information, so that precision of the target data collected by the context-aware engine is consistent with data precision defined by the data precision information.

In a possible implementation, step F includes:
when the characteristic information included in the context-aware model is frequency definition information, collecting, by the context-aware engine, the target data based on the frequency definition information, so that the context-aware engine collects the target data based on frequency defined by the frequency definition information.

A third aspect provides a context-aware system, including a controller and a context-aware engine, where the controller is configured to send a created context-aware model to the context-aware engine, where the context-aware model is used to define preset control performed when target data meets a trigger condition, and the preset control is used to implement a context-aware function; and the context-aware model is further used to instruct the context-aware engine to send indication information to the controller when the context-aware engine determines that the target data meets the trigger condition, where the indication information is used to indicate that the target data meets the trigger condition;

the context-aware engine is configured to: receive the context-aware model and obtain the target data based on the context-aware model; and further configured to: determine, based on the context-aware model, whether the target data meets the trigger condition, and if determining that the target data meets the trigger condition, send the indication information to the controller; and the controller is configured to: receive the indication information, and perform the preset control based on the indication information.

For a specific execution process of performing the control method by the controller, refer to the first aspect. Details are not described again.

For a specific execution process of performing the control method by the context-aware engine, refer to the second aspect. Details are not described again.

In a possible implementation, the controller is further configured to: determine the characteristic information used to implement a context-aware function, and set the characteristic information in the context-aware model, to create the context-aware model.

For a specific process of creating the context-aware model by the controller, refer to the first aspect. Details are not described again.

In a possible implementation, the characteristic information includes any one or more of the following: network entity type definition information, network entity function definition information, data attribute definition information, interface definition information, and data threshold information, where the network entity type definition information is used to define a type of a target device from which the context-aware engine collects the target data;

the network entity function definition information is used to define a function of the target device from which the context-aware engine collects the target data;

the data attribute definition information is used to define a data type of the target data collected by the context-aware engine;

the interface definition information is used to define an interface through which the context-aware engine collects the target data; and the data threshold information is used to define a value range of the target data collected by the context-aware engine.

For specific descriptions of the characteristic information included in the context-aware model, refer to the first aspect. Details are not described again.

A fourth aspect provides a controller, where the controller includes:

a sending unit, configured to send a created context-aware model to a context-aware engine, where the context-aware model is used to define preset control performed when target data meets a trigger condition, and the preset control is used to implement a context-aware function; and the context-aware model is further used to instruct the context-aware engine to send indication information to the controller when the context-aware engine determines that the target data meets the trigger condition, where the indication information is used to indicate that the target data meets the trigger condition;

a receiving unit, configured to receive the indication information; and a control unit, configured to perform the preset control based on the indication information.

For a specific process of performing the control method by the controller, refer to the first aspect. Details are not described again.

In a possible implementation, the controller further includes a configuration unit, configured to: determine characteristic information used to implement a context-aware function, and set the characteristic information in the context-aware model, to create the context-aware model.

For specific descriptions of creating the context-aware model by the controller, refer to the first aspect. Details are not described again.

In a possible implementation, the characteristic information includes any one or more of the following: network entity type definition information, network entity function definition information, data attribute definition information, interface definition information, and data threshold information, where the network entity type definition information is used to define a type of a target device from which the context-aware engine collects the target data;

the network entity function definition information is used to define a function of the target device from which the context-aware engine collects the target data;

the data attribute definition information is used to define a data type of the target data collected by the context-aware engine;

the interface definition information is used to define an interface through which the context-aware engine collects the target data; and the data threshold information is used to define a value range of the target data collected by the context-aware engine.

For specific descriptions of creating, by the controller, the characteristic information included in the context-aware model, refer to the first aspect. Details are not described again.

A fifth aspect provides a context-aware engine, where the context-aware engine includes:

a receiving unit, configured to receive a context-aware model sent by a controller, where the context-aware model is used to define preset control performed when target data meets a trigger condition, and the preset control is used to implement a context-aware function; and the context-aware model is further used to instruct the context-aware engine to send indication information to the controller when the context-aware engine determines that the target data meets the trigger condition, where the indication information is used to indicate that the target data meets the trigger condition;

an obtaining unit, configured to obtain, based on the context-aware model, the target data defined by the context-aware model;

a determining unit, configured to determine whether the target data meets the trigger condition defined by the context-aware model; and a sending unit, configured to send the indication information to the controller when it is determined that the target data meets the trigger condition defined by the context-aware model.

For a specific process of performing the control method by the context-aware engine, refer to the second aspect. Details are not described again.

This application provides a control method, a related device, and a system which construct the context-aware model, so that the context-aware engine obtains the target data based on the context-aware model, and sends, to the controller, the indication information used to indicate that the target data meets the trigger condition. In this way, the controller can perform the preset control. When performing the preset control, the controller may provide a proactive service based on the context-aware model, and when the control method provided in this application is applied to different scenarios, the controller may configure different context-aware models to be applied to different application scenarios. In addition, the controller performs network control, and the context-aware engine obtains and forwards the target data, so that the controller performs centralized network control, to obtain a global intelligent control capability, thereby improving efficiency of performing context-aware control by the controller.

DESCRIPTION OF EMBODIMENTS

An aspect of this disclosure is related to a control method. In some embodiments, the control method is based on a context-aware system.

Figure 1:
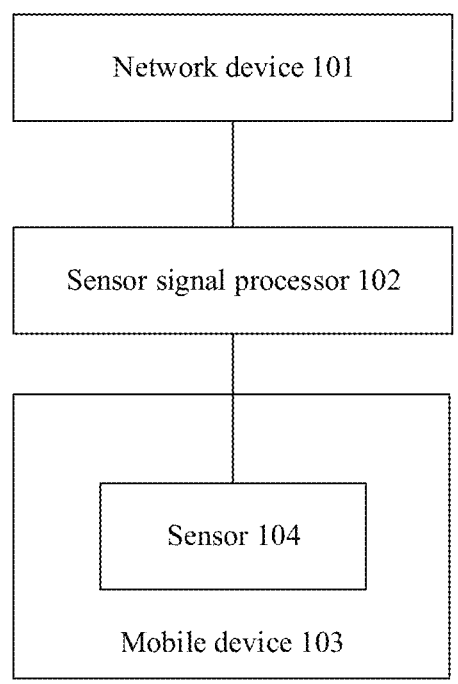
FIG. 1 is a schematic structural diagram of a communications system.
Figure 2:
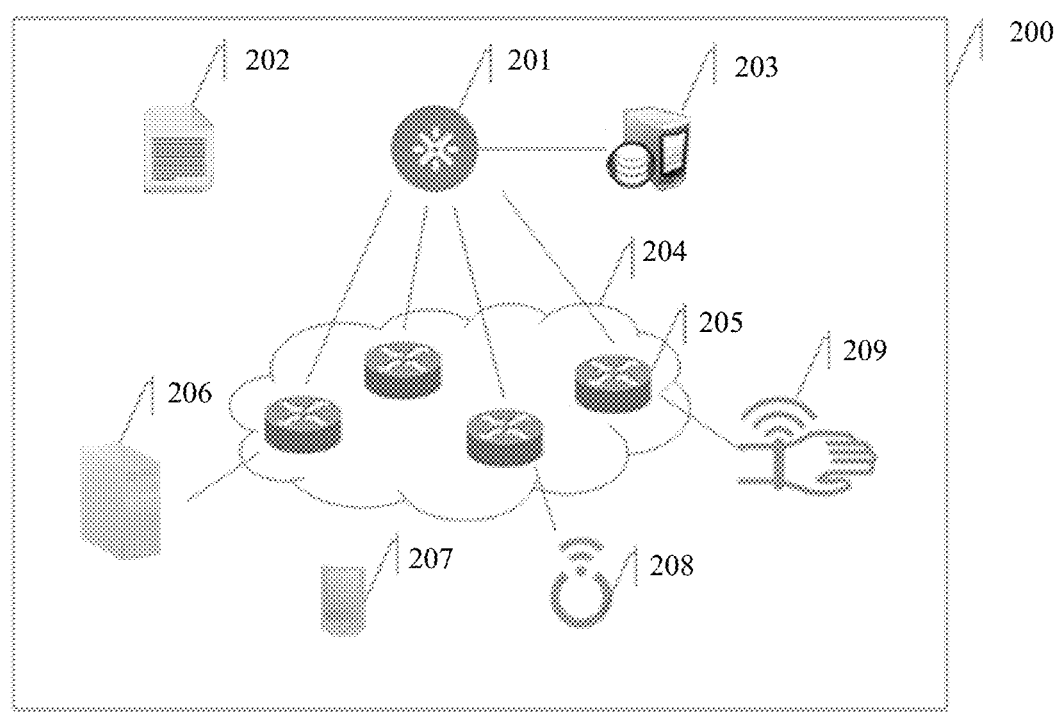
FIG. 2 is an example of a structural diagram of a context-aware system according to one or more embodiments.

FIG. 2 is a schematic diagram of a context-aware system according to one or more embodiments.

The context-aware system 200 shown in FIG. 2 is an internet of things (IoT). The context-aware system 200 includes, but is not limited to, a controller 201, a context-aware engine 203, an interconnection network 204, a network device 205, a network service device 206, a mobile device 207, a wireless sensor 208, a wearable device 209, and the like.

The controller 201 is described by using a software defined networking (SDN) controller as an example.

The context-aware system 200 implements interconnection between things based on the SDN network controller 201. In this way, the context-aware system 200 can sense a data transmission intention more intelligently and more efficiently.

The SDN network controller 201 is a network control device on a network control plane. The SDN network controller 201 in this embodiment provides southbound network device management. The SDN network controller 201 implements, by using a southbound interface, network device management matters including link discovery, topology management, policy formulation, entry delivery, and the like.

The SDN network controller 201 in this embodiment provides a northbound network control and orchestration service. The SDN network controller 201 enables, through a northbound interface, a network service developer to invoke various network resources in a software programming form, to implement the network control and orchestration service.

When the SDN network controller 201 provides the southbound network device management, the SDN network controller 201 communicates with the network device 205 by using a network protocol such as an OpenFlow (OF) protocol and/or a network configuration protocol (NETCONF), to control and configure the network device 205.

The interconnection network 204 included in the context-aware system 200 in this embodiment includes, but is not limited to, a communications network such as a data center network, a wide area network, a wireless network, and the internet of things. The interconnection network 204 is configured to provide a basis for communicating with a peripheral system and device.

The network device 205 included in the context-aware system 200 includes, but is not limited to, a router, a switch, a softswitch, and the like. The network device 205 forwards data under control of the SDN network controller 201. The SDN network controller 201, serving as the network control plane, intelligently controls forwarding of the network device 205.

The network service device 206 included in the context-aware system 200 is a device that provides a network data service, and obtains corresponding data information through network access, for example, weather data, traffic information data, and geographic location data of a place.

The mobile device 207 is not limited to a personal digital assistant (PDA), a smartphone, a tablet, a water heater, and the like, and the mobile device 207 interacts with the controller 201 and the context-aware engine 203 by using the interconnection network 204.

The wireless sensor 208 and the wearable device 209 that are included in the context-aware system 200 may provide sensor data to the context-aware engine 203.

Figure 3:
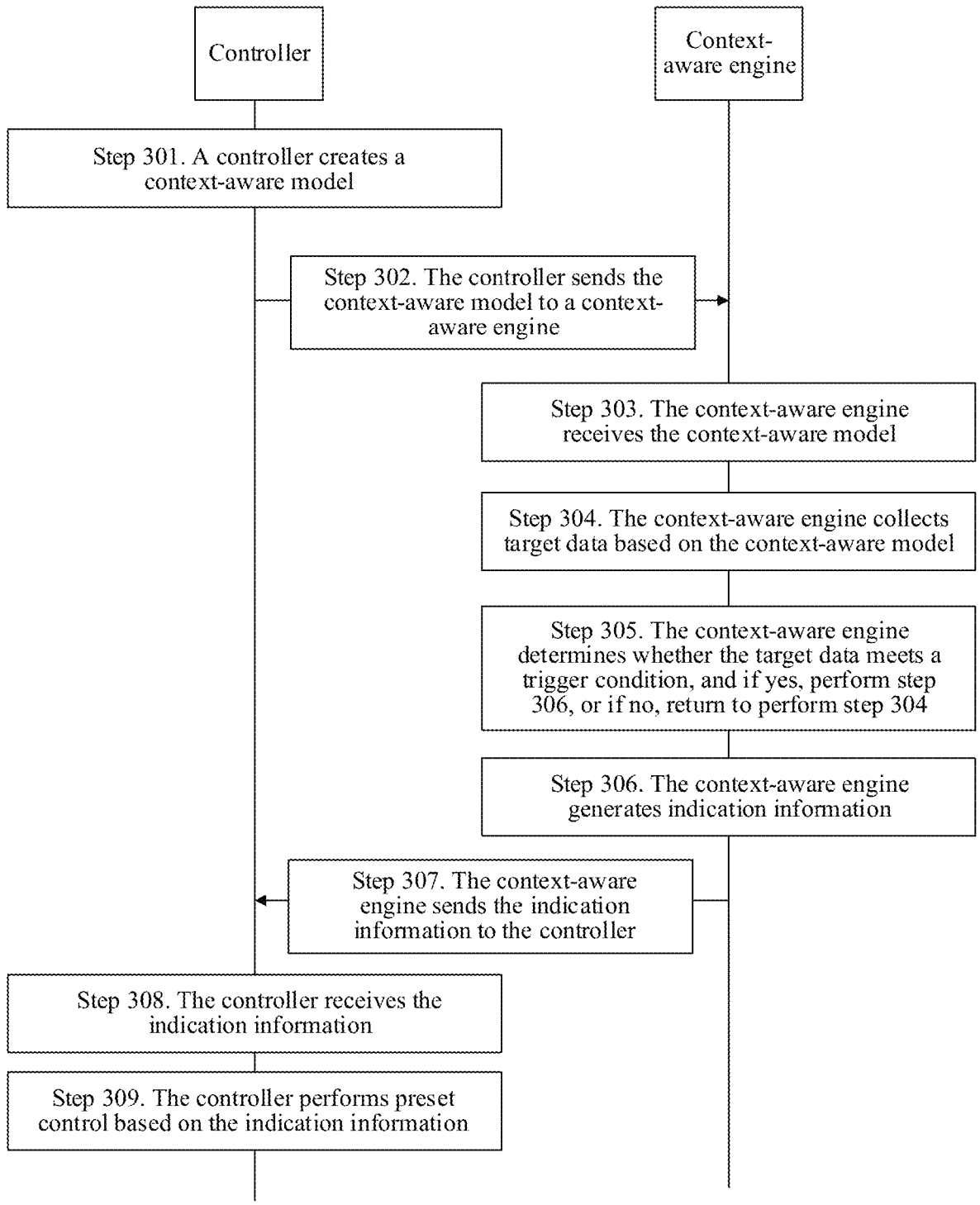
FIG. 3 is an example of a procedure flowchart of a control method according to one or more embodiments.

Based on the foregoing context-aware system, with reference to FIG. 3, the following describes in detail a specific execution process of a control method provided in an embodiment.

As shown in FIG. 3, the control method in this embodiment includes the following steps.

Step 301. A controller creates a context-aware model.

A defining process of the context-aware model can be implemented in step 301 in this embodiment. For example, context-aware model can be created by using the defining process of the context-aware model.

The following first describes the context-aware model in this embodiment:

The context-aware model in this embodiment models a scenario and a network application by using a domain-specific modeling language, so that the controller having a context-aware capability can proactively drive the network application.

The network application in this embodiment may be an application on the mobile device 207, or may be an application of the controller. The application of the controller may be used to turn on a network, or may be used to turn off a network. Alternatively, the network application may be an application used to provide a programming interface to a third party. The context-aware model created in this embodiment can enable the context-aware system to have the context-aware capability.

A specific process of creating the context-aware model may be as follows:

The controller may first determine a context-aware function that can be supported by the controller, so that the controller may configure the context-aware model based on the context-aware function, and the context-aware system can implement, by using the context-aware model, the context-aware function defined by the context-aware model.

For example, if the controller determines that the context-aware function that can be supported by the controller is: clocking in/out for a user using the mobile device 207. The context-aware system determines, based on a context-aware model that can clock in/out for a user, whether a current location at which the user is located is in an area in which the company is located. If the current location at which the user is located is in the area in which the company is located, the context-aware system may automatically clock in/out for the user, and in a clock in/out process, the user does not need to perform any operation.

For another example, if the controller determines that the context-aware function that can be supported by the controller is: automatically enabling a water heater at a user's home to heat. The context-aware system determines, based on a context-aware model that can enable a water heater to heat, whether a distance between a current location of the user and the home is less than a preset value. If yes, the context-aware system can automatically enable the water heater at the user's home to heat, and in a heating process, the user does not need to perform any operation on the water heater.

This embodiment does not make any limitation on how the controller determines the context-aware function that can be supported by the controller, provided that the controller can configure the context-aware model based on the supported context-aware function. For example, the controller in this embodiment may determine a supported context-aware function based on a configuration of the controller. For another example, the controller may determine a supported context-aware function based on a configuration of a developer. For still another example, the controller may determine a supported context-aware function by using data obtained by a sensor control interface that is of the controller and that is for external exchange.

Optionally, the controller needs to exchange information with an external device to create the context-aware model. The external device may be the network device 205, the network service device 206, the mobile device 207, the wireless sensor 208, the wearable device 209, or the like. A sensor control interface configured to exchange information with the external device is disposed in the controller, so that the controller can receive, by using the sensor control interface, information sent by the external device, and can configure the context-aware model based on the information sent by the external device.

It should be noted that, information that is sent by the external device and that is received by the controller in this embodiment may not be limited in the process of creating the context-aware model. Details are not limited in this embodiment.

The following describes, by using an example, how the controller creates the context-aware model:

The controller may determine characteristic information used to implement the context-aware function, and set the characteristic information in the context-aware model through text modeling, for example, by setting the characteristic information in a text format in the context-aware model.

The characteristic information in this embodiment includes any one or more of the following: network entity type definition information, network entity function definition information, data attribute definition information, interface definition information, measurement definition information, data threshold information, frequency definition information, and data precision information.

Descriptions are provided by using an example in which the characteristic information includes the network entity type definition information.

The controller in this embodiment may perform modeling based on an abstract entity, and create a type set, where the type set includes at least one network entity, and all network entities in a same type set have a same network entity type.

The network entity in this embodiment may be a general name of various devices in the context-aware system, such as a node device, a communications device, a terminal device, a storage device, and other hardware devices that serve the network entity.

For example, types of all network entities in a type set created by the controller are smartphones, or types of all network entities in a type set are smart televisions, or types of all network entities in a type set are water heaters.

The controller may determine the network entity type definition information, where the network entity type definition information is used to define a type of a network entity. In this embodiment, the network entity type definition information defined by the controller can implement the context-aware function.

For example, the network entity type definition information may be used to define the type of the network entity as a smartphone. For another example, the network entity type definition information may be used to define the type of the network entity as a wearable device.

When the network entity type definition information has been set in the context-aware model created by the controller, the context-aware engine may collect target data from a target device based on the context-aware model. A device type of the target device in this embodiment is consistent with the type defined by the network entity type definition information.

In a specific application scenario, if the controller determines that a context-aware model that can implement a clock in/out function needs to be created, the network entity type definition information created by the controller may be used to define the type of the network entity as a smartphone carried by a user. In this way, the context-aware engine can collect, based on the context-aware model, the target data from the smartphone used as the target device.

Descriptions are provided by using an example in which the characteristic information includes the network entity function definition information.

The controller in this embodiment performs modeling based on an attribute of a network entity.

The controller determines the network entity function definition information, where the network entity function definition information is used to define a function of the network entity.

In this embodiment, the network entity having the function defined by the network entity function definition information may implement the context-aware function in this embodiment.

In this way, the controller can set the network entity function definition information in the context-aware model, so that the context-aware engine collects target data from a target device, where a function of the target device in this embodiment is consistent with the function defined by the network entity function definition information.

The function defined by the network entity function definition information in this embodiment may be a global positioning system (GPS) positioning function, a function of obtaining outdoor temperature data, a function of obtaining a body parameter, or the like. The body parameter may be a heartbeat parameter, a body temperature parameter, or the like.

In a specific application scenario, if the controller determines that a context-aware model that can implement a clock in/out function needs to be created, the function defined by the network entity function definition information created by the controller is a GPS positioning function. In this way, the context-aware engine can collect, based on the context-aware model, data from a target device that has the GPS positioning function.

Descriptions are provided by using an example in which the characteristic information includes the data attribute definition information.

The data attribute definition information in this embodiment is used to define a data type, so that the context-aware engine determines, based on the context-aware model in which the data attribute definition information is set, a data type of the collected target data is consistent with the data type defined by the data attribute definition information.

From the foregoing descriptions that the target device may be defined by using the network entity type definition information and/or the network entity function definition information that are/is included in the context-aware model.

In a specific application, data generated by the target device may include data with a plurality of attributes, such as temperature data, GPS positioning data, signal data, and call data. The controller in this embodiment may define, by using the data attribute definition information, an attribute of specific data that needs to be currently collected. For example, in a specific application scenario, if the controller determines that a context-aware model that can implement a clock in/out function needs to be created, the target data defined by the data attribute definition information created by the controller is the GPS positioning data. In this case, the context-aware engine can collect, from the target device based on the context-aware model, the GPS positioning data generated by the target device.

Descriptions are provided by using an example in which the characteristic information includes the interface definition information.

The controller in this embodiment determines the interface definition information, where the interface definition information is used to define a data interface.

The interface definition information is used to define a protocol for collecting the target data, such as a wireless fidelity (Wi-Fi) protocol, so that the context-aware engine collects the target data based on an interface defined by the interface definition information.

In a specific application scenario, if the controller determines that the context-aware model that can implement the clock in/out function needs to be created, the interface definition information created by the controller is the Wi-Fi protocol. In this case, the context-aware engine can collect the target data based on the context-aware model by using the Wi-Fi protocol.

Descriptions are provided by using an example in which the characteristic information includes the measurement definition information.

The controller in this embodiment determines the measurement definition information, where the measurement definition information is used to define a data measurement unit, so that a measurement unit of the target data collected by the context-aware engine is consistent with the data measurement unit defined by the measurement definition information.

In a specific application scenario, if the controller determines that a context-aware model that can automatically enable a water heater at a user's home to heat needs to be created, the measurement definition information created by the controller may be used to define a data unit as degree Celsius. In this way, the context-aware engine can collect data with a measurement unit of degree Celsius based on the context-aware model. For another example, the measurement definition information created by the controller may be used to define a data unit as Fahrenheit. In this case, the context-aware engine can collect, based on the context-aware model, data with a measurement unit of Fahrenheit.

Descriptions are provided by using an example in which the characteristic information includes the data threshold information.

The controller in this embodiment determines the data threshold information, where the data threshold information is used to define a value range of the target data, so that a data range of the target data collected by the context-aware engine is consistent with the data range defined by the data threshold information.

In a specific application scenario, if the controller determines that a context-aware model that can automatically enable a water heater at a user's home to heat needs to be created, a value range defined by the data threshold information created by the controller may be higher than 45 degrees Celsius. In this case, when water temperature that is reported on the water heater and that is collected by the context-aware engine is 36.7 degrees Celsius, the context-aware engine may determine, based on the data threshold information included in the context-aware model, that the water temperature reported on the water heater is ignored, and the context-aware engine does not analyze the water temperature higher than 45 degrees Celsius based on the context-aware model until when the context-aware engine determines that the water temperature reported on the water heater is higher than 45 degrees Celsius.

Descriptions are provided by using an example in which the characteristic information includes the data precision information.

The controller in this embodiment determines the data precision information, where the data precision information is used to define precision of the target data, so that precision of the target data collected by the context-aware engine is consistent with the data precision defined by the data precision information.

In a specific application scenario, if the controller determines that a context-aware model that can automatically enable a water heater at a user's home to heat needs to be created, the data precision defined by the data precision information created by the controller is an integer. In this case, when water temperature that is reported on the water heater and that is collected by the context-aware engine is 45.7 degrees Celsius, the context-aware engine can determine, based on the data precision information included in the context-aware model, that the target data is 45, so that precision of the target data is consistent with the data precision defined by the data precision information.

Descriptions are provided by using an example in which the characteristic information includes the frequency definition information:

The controller in this embodiment determines the frequency definition information, where the frequency definition information is used to define frequency of collecting the target data, so that the context-aware engine collects the target data based on the frequency defined by the frequency definition information.

In a specific application scenario, if the controller determines that a context-aware model that can automatically enable a water heater at a user's home to heat needs to be created, the frequency definition information created by the controller may be used to define an interval of collecting the target data to be five minutes. In this case, the context-aware engine can collect, based on the frequency definition information included in the context-aware model, water temperature reported on the water heater once every five minutes.

In a process of creating the context-aware model in this embodiment, the controller further needs to determine a trigger condition and preset control, so that the controller performs the preset control when the target data meets the trigger condition. The preset control is a control manner that is defined by the context-aware model and that is used to implement the context-aware function.

To better understand the trigger condition and the preset control, the following provides descriptions with reference to a specific application scenario.

In an optional application scenario, if the context-aware function that can be supported by the controller is clocking in/out for a user who uses a terminal device, the trigger condition may be: GPS positioning data reported by the terminal device carried by the user indicates that the user is located in an area in which a company is located. In this case, the preset control may be controlling, by the controller, a server that is configured to clock in/out for an employee and that belongs to the company to perform a clock in/out operation for the user.

In an optional application scenario, if the context-aware function that can be supported by the controller is automatically enabling a water heater at a user's home to heat, the trigger condition may be: a distance between a location indicated by GPS positioning data reported on the terminal device that is carried by the user and the user's home is less than three kilometers. In this case, the preset control may be automatically enabling the water heater at the user's home to heat. The trigger condition may alternatively be: water temperature reported on the water heater at the user's home is higher than or equal to 45 degrees Celsius. In this case, the preset control may be stopping enabling the water heater at home to heat.

The foregoing descriptions of creating the context-aware model are an optional example and are not limited, provided that the controller can configure the context-aware model that can implement the context-aware function.

In some embodiments, a function that can be implemented by the controller is described by using an optional example. It should be noted that, in this embodiment, descriptions of the function that can be implemented by the controller is an optional example and is not limited.

Step 302. The controller sends the context-aware model to the context-aware engine.

Step 303. The context-aware engine receives the context-aware model.

A northbound sensor control interface is disposed in the context-aware engine in this embodiment. The context-aware engine exchanges data with the controller through the northbound sensor control interface.

The context-aware engine receives the context-aware model through the northbound sensor control interface.

The context-aware engine may parse the context-aware model to read the characteristic information included in the context-aware model. For detailed descriptions of the characteristic information included in the context-aware model, refer to step 301. Details are not described in this embodiment.

Step 304. The context-aware engine collects the target data based on the context-aware model.

After parsing out the characteristic information included in the context-aware model, the context-aware engine may collect the target data based on the characteristic information included in the context-aware model.

The controller sends the context-aware model to the context-aware engine, so that the context-aware model subscribes to and processes the target data based on the context-aware model.

A manner in which the context-aware engine processes the target data is not limited in this embodiment, provided that the context-aware system in this embodiment can implement the context-aware function. For example, the context-aware engine can parse, filter, and convert the target data based on the context-aware model, so that the target data meets the definition of the context-aware model.

Based on the characteristic information included in the context-aware model, the following describes how the context-aware model collects the target data.

Optionally, when the characteristic information included in the context-aware model is the network entity type definition information, the context-aware engine may determine, based on the network entity type definition information, the target device configured to obtain the target data, where the device type of the target device is consistent with the type defined by the network entity type definition information.

Optionally, when the characteristic information included in the context-aware model is the network entity function definition information, the context-aware engine may determine, based on the network entity function definition information, a function of the target device configured to obtain the target data, where the function of the target device is consistent with the function defined in the network entity function definition information.

Optionally, when the characteristic information included in the context-aware model is the data attribute definition information, the context-aware engine may collect the target data from the target device based on the data attribute definition information, where the data type of the collected target data is consistent with the data type defined by the data attribute definition information.

Optionally, when the characteristic information included in the context-aware model is the interface definition information, the context-aware engine may collect the target data based on the interface defined by the interface definition information.

Optionally, when the characteristic information included in the context-aware model is the measurement definition information, the context-aware engine may collect the target data based on the measurement definition information, so that the measurement unit of the target data collected by the context-aware engine is consistent with the data measurement unit defined by the measurement definition information.

Optionally, when the characteristic information included in the context-aware model is the data threshold information, the context-aware engine may collect the target data based on the data threshold information, so that the data range of the target data collected by the context-aware engine is consistent with the data range defined by the data threshold information.

Optionally, when the characteristic information included in the context-aware model is the data precision information, the context-aware engine may collect the target data based on the data precision information, so that the precision of the target data collected by the context-aware engine is consistent with the data precision defined by the data precision information.

Optionally, when the characteristic information included in the context-aware model is the frequency definition information, the context-aware engine may collect the target data based on the frequency definition information, so that the context-aware engine collects the target data based on the frequency defined by the frequency definition information.

In some embodiments, the context-aware engine can determine, by using the frequency definition information, a time window within which the target data needs to be collected, and the context-aware engine can collect the target data from the target device based on the time window.

In a process in which the context-aware system implements the context-aware function, the target data may be streaming sensor data reported by various devices in the context-aware system.

Step 305. The context-aware engine determines whether the target data meets the trigger condition, and if yes, performs step 306, or if no, returns to perform step 304.

The trigger condition is a condition created by the context-aware model. For specific descriptions, refer to the foregoing steps. Details are not described in this step.

The context-aware engine in this embodiment may perform analysis processing on the obtained target data that meets the definition of the context-aware model, to determine whether the target data meets the trigger condition.

The following describes how the context-aware engine determines whether the target data meets the trigger condition:

Optionally, the context-aware engine can calculate the target data based on a preset condition included in the context-aware engine, so that the context-aware engine performs logical reasoning on the target data to determine whether the target data meets the trigger condition.

For example, the context-aware function implemented by the context-aware model is automatically enabling the water heater at the user's home to heat. In this case, the trigger condition defined by the context-aware model is reporting indication information when a distance between a geographical location at which the user is currently located and the user's home is less than three kilometers, so that the controller automatically instructs, based on the indication information, the water heater to heat. In this application scenario, the context-aware engine may obtain, based on information that is used to collect data and that is included in the context-aware model, current geographic location information of the user from a terminal device used by the user, and determine, based on the current geographic location information of the user, whether the distance between a geographic location at which the user is currently located and the user's home is less than three kilometers. If yes, the context-aware engine may determine that the target data meets the trigger condition.

Optionally, the context-aware engine determines the target data based not only on the context-aware model but also on data prestored in the context-aware engine.

For example, when the context-aware model implements a context-aware function of automatically enabling a water heater at a user's home to heat, the data prestored in the context-aware engine may be a time period within which the user is off duty. For example, the context-aware engine may store a time period within which the user is off duty from 7:00 p.m. to 6:00 a.m.

The context-aware function implemented by the context-aware model is automatically enabling the water heater at the user's home to heat. In this case, the trigger condition defined by the context-aware model is reporting indication information when a distance between a geographical location at which the user is currently located and the user's home is less than three kilometers, so that the controller automatically instructs, based on the indication information, the water heater to heat. In this application scenario, the context-aware engine may query data prestored by the context-aware engine to determine whether a current time period is a time period within which the user is off duty. If yes, the context-aware engine may query current geographic location information of the user, or if no, the context-aware engine may not query current geographic location information of the user. When determining that the current time period is the time period within which the user is off duty, the context-aware engine determines whether the target data meets the trigger condition defined by the context-aware model.

Step 306. The context-aware engine generates the indication information.

It can be learned from step 305 that the indication information is used to indicate that the target data obtained by the context-aware engine meets the trigger condition defined by the context-aware model.

Step 307. The context-aware engine sends the indication information to the controller.

Step 308. The controller receives the indication information.

The controller in this embodiment receives, through a northbound sensor control interface, the indication information sent by the context-aware engine.

Step 309. The controller performs preset control based on the indication information.

The preset control in this embodiment is a control manner defined by the context-aware model.

In this embodiment, before performing the preset control, the controller may first generate application configuration information and/or a network control constraint.

The controller implements the preset control by using the application configuration information and/or the network control constraint.

For example, if the context-aware function implemented by the created context-aware model is clocking in/out for a user, the controller may establish, when the context-aware model has been created by the controller, a communication link between a southbound network device interface of the controller and a server configured to clock in/out for the user.

When receiving the indication information sent by the context-aware engine, the controller may determine the preset control that has been defined by the context-aware model. In this application scenario, the preset control is clocking in/out for the user. In this case, the controller may send the application configuration information to the server through the established communications link between the controller and the server configured to clock in/out for the user, so that the server can clock in/out for the user.

For another example, if the context-aware function implemented by the created context-aware model is data packet transfer, and the context-aware system includes a plurality of links used to control a network application, when the context-aware model has been created, the controller may control the links by using a configured network control constraint.

When the controller receives the indication information sent by the context-aware engine, the target data defined by the context-aware model is bandwidth of a link, and the trigger condition defined by the context-aware model is that bandwidth utilization of the link is greater than or equal to 80%, the controller may determine the preset control defined by the context-aware model. In this application scenario, the preset control is transferring a packet on the link to a preset server or discarding a packet on the link, to avoid congestion.

A manner of performing preset control by the controller in this embodiment is not described in detail in this embodiment. For example, the controller may control network layer forwarding, a network status, network connectivity, a network device, a device connection, device management, a device protocol, and the like, provided that the context-aware function can be implemented.

The following describes beneficial effects of the control method in this embodiment:

In some embodiments, the context-aware model is constructed with reference to a context-aware technology. The context-aware model defines the target data that needs to be obtained, the trigger condition, and the preset control, so that the controller can perform the preset control when determining that the target data meets the trigger condition. When performing the preset control, the controller does not need to be constrained by a driver installed in the terminal device, so that the controller can provide a proactive service based on the context-aware model. In addition, when the control method in this embodiment is applied to different scenarios, the controller may configure different context-aware models, so that the controller controls a network to implement different context-aware capabilities, thereby extending an application range of intelligent network control.

According to the control method in this embodiment, the controller performs network control, and the context-aware engine obtains and forwards the target data, so that the controller performs centralized network control, to obtain a global intelligent control capability. In addition, in this embodiment, the context-aware engine processes data, thereby improving efficiency of performing context-aware control by the controller.

To better understand the control method in accordance with some embodiments, the following describes, with reference to a specific application scenario, a specific application process of the control method in an application scenario of data center migration.

Figure 4:
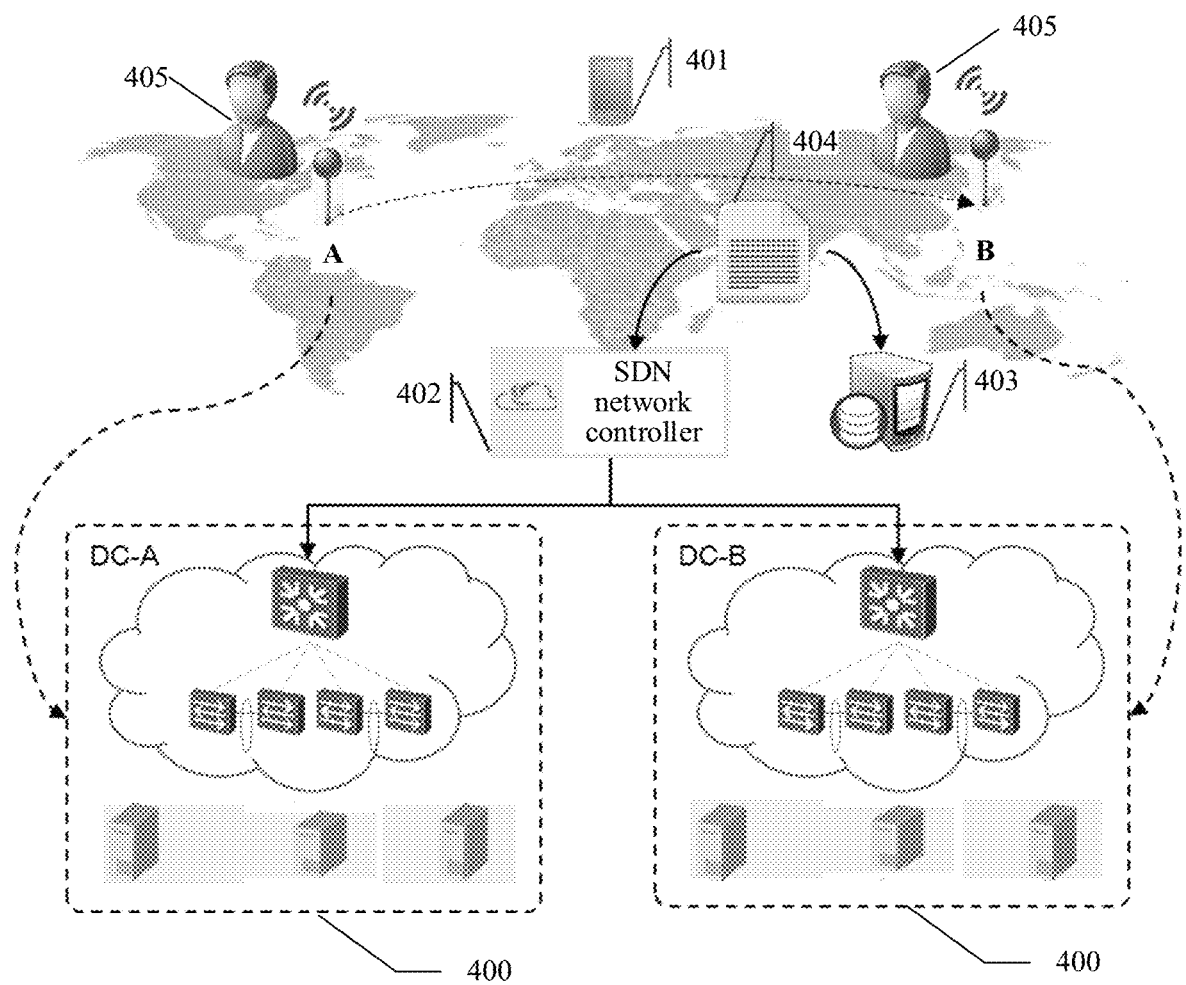
FIG. 4 is an example of a diagram of an application scenario according to one or more embodiments.

Various resources are deployed in a data center 400 shown in FIG. 4, the data center 400 is deployed in a distributed manner, and the resources are decentralized in the data center 400 nearest to a tenant 405.

In the prior art, when needing to obtain a network resource of the tenant 405, the data center 400 coordinates network resource of the tenant 405. For example, when the tenant 405 is at a location A, a tenant resource may be deployed in a data center DC-A currently nearest to the tenant 405. When the tenant 405 is migrated from the location A to a location B, a network resource obtained by the tenant 405 at the location B needs to be obtained from a data center DC-B nearest to the tenant 405. In this case, the resource in the data center DC-A is configured and synchronized to the data center DC-B after a specific delay. In this way, after the tenant 405 is migrated to the location B, data in the data center DC-B can be obtained.

In the prior art, a passively triggered resource response is used, to be specific, the resource in the data center DC-A can be triggered, so that the resource is configured and synchronized to the data center DC-B after a specific delay only when it is determined that the tenant 405 has migrated from the location A to the location B. It can be learned that timeliness of resource configuration is low.

The following describes a specific process of migrating, by the data center with reference to a context-aware technology, resources in the data center in this application scenario by applying the control method in accordance with one or more embodiments.

In this application scenario, the SDN network controller 402 may configure a context-aware model 404 for migrating the resources in the data center.

The context-aware model 404 in this application scenario may include characteristic information used to implement a context-aware function.

The characteristic information includes network entity type definition information, where the SDN network controller 402 may define the network entity type definition information by using a keyword. Types of network entities defined by the network entity type definition information include the data center DC-A and the data center DC-B, and the network entity type definition information further defines a mobile phone 401 carried by the tenant 405.

The characteristic information may further include interface definition information, where the SDN network controller 402 may define the interface definition information of the mobile phone 401 by using a keyword, so that the context-aware engine 403 obtains, based on the interface definition information, an interface for collecting the target data.

The characteristic information may further include data attribute definition information, where the SDN network controller 402 may define the data attribute definition information by using a keyword, so that the context-aware engine 403 determines, based on the data attribute definition information, a type of the target data that can be obtained. In this application scenario, the type of the target data defined by the data attribute definition information is geographic location information of the mobile phone 401.

The characteristic information may further include frequency definition information, where the frequency definition information may define frequency of obtaining the target data to be one hour.

The characteristic information may further include operation capability definition information, so that the context-aware engine 403 can perform a derivation operation on the obtained target data by using the operation capability definition information.

The operation capability definition information defines a binary operation, for example, a logical operation such as an OR operation (OR), an AND operation (AND), or a NOT operation (NOT), for condition triggering. The context-aware engine 403 determines, based on the operation capability definition information, whether the indication information needs to be sent to the SDN network controller 402.

After the SDN network controller 402 configures the context-aware model, the SDN network controller 402 can send the context-aware model to the context-aware engine 403.

In this embodiment, the mobile phone 401 carried by the tenant 405 may be registered on the context-aware engine 403. For specific descriptions of the context-aware engine 403, refer to the foregoing embodiment. Details are not described in this application scenario. The context-aware engine 403 can obtain, based on the context-aware model 404 from the registered mobile phone 401, geographic location information of the tenant 405 that is used as the target data.

In this application scenario in which the tenant 405 is from the location A to the location B, the context-aware engine 403 obtains the geographical location information of the tenant 405 based on the context-aware model, and performs a logical operation. When the trigger condition is reached, the SDN network controller 402 is instructed, by using the indication information, to perform preset control on a network of the tenant 405.

The trigger condition in this application scenario may be that a distance between a current location of the tenant 405 and the data center DC-A is greater than or equal to a first threshold, and a distance between the current location of the tenant 405 and the data center DC-B is less than or equal to a second threshold. This indicates that the user is migrating from the location A to the location B.

The context-aware engine 403 sends, to the SDN network controller 402, the indication information used to indicate that the target data meets the trigger condition.

When receiving the indication information, the SDN network controller 402 can determine that the target data meets the trigger condition, and can perform preset control based on the context-aware model, where the preset control is performing virtual machine migration for the tenant 405.

In this application scenario, the SDN network controller 402 can configure and synchronize the resources in the data center DC-A to the data center DC-B in a process in which the tenant 405 is migrated from the location A to the location B, that is, when the tenant 405 has not reached the location B, so that the resources have been migrated when the tenant 405 arrives at the location B.

The context-aware model 404 in this application scenario is used to migrate a data center, and the control method in this application scenario may also be reused in another application scenario. For example, the control method in this application may be applied to an office automation (OA) card swiping system, to implement automatic clocking in/out for an employee, and in an application process, only the context-aware model needs to be changed. For example, the target data included in the context-aware model is GPS data of the employee, the trigger condition is that the GPS data of the employee is within a range of a plant area, and the preset control is clocking in/out for the employee. In this way, the OA card swiping system may automatically clock in/out for the employee when determining that the GPS data of the employee is within the range of the plant area, and the employee does not need to input a clock in/out operation during a clock in/out process, greatly improving clock in/out efficiency for the employee.

Figure 5:
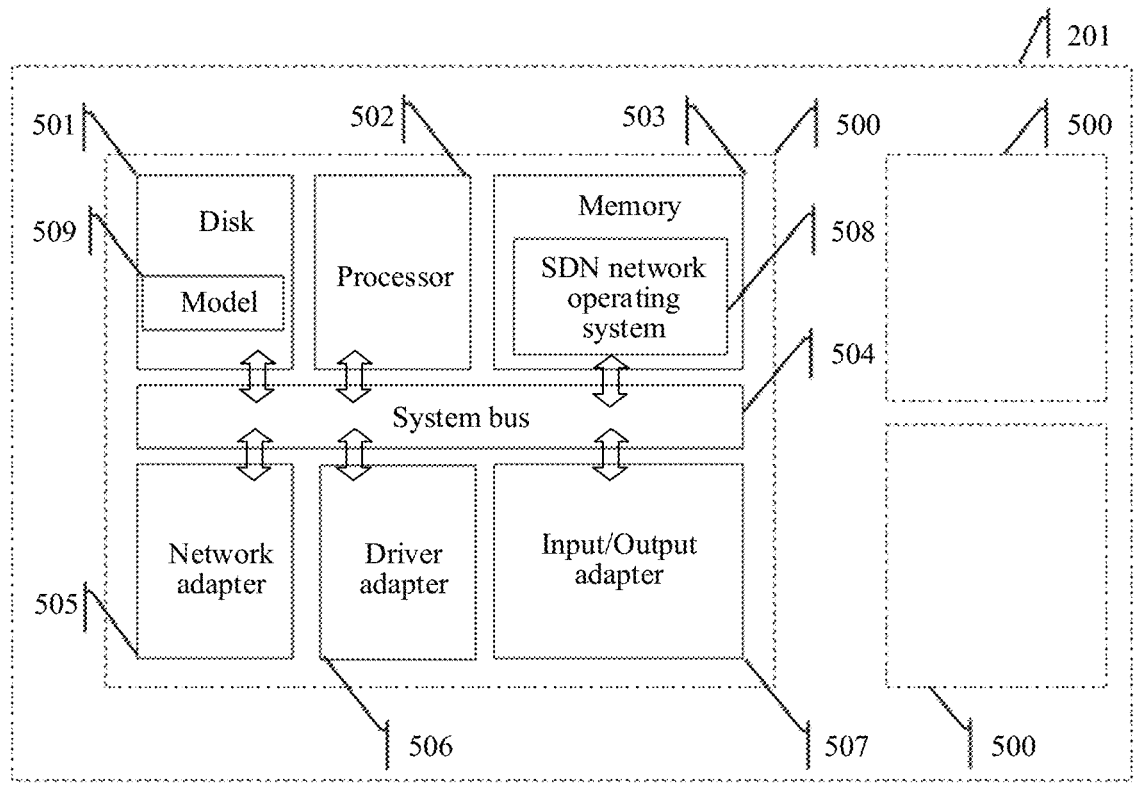
FIG. 5 is an example of a structural diagram of a controller according to one or more embodiments.

With reference to FIG. 5, the following describes in detail a specific structure of the controller in this embodiment. FIG. 5 is a schematic diagram of a hardware structure of an embodiment of the controller according to t one or more embodiments.

The controller in this embodiment can implement the control method shown in FIG. 3. For a specific execution process, refer to FIG. 3. Details are not described again.

The controller 201 may include one or more controllers running a computer system 500.

The computer system 500 in this embodiment mainly includes a disk 501, and the disk 501 is used as a persistent data storage medium and is configured to store a context-aware model 509.

It should be noted that descriptions of a storage medium used to store the context-aware model 509 are an optional example and are not limited in this embodiment. In another application scenario, the context-aware model 509 may alternatively be stored by using another storage medium. Details are not limited in this embodiment.

The computer system 500 in this embodiment can read and modify the stored context-aware model 509.

The computer system 500 in this embodiment further includes a processor 502, and the processor 502 can configure the context-aware model 509 and store the context-aware model 509 on the disk 501.

The computer system 500 further includes a memory 503, and the memory 503 is configured to cache running data that is used to run an SDN network operating system 508 and model data of the context-aware model 509.

When the controller 201 in this embodiment runs the SDN network operating system 508, the controller 201 can perform the control method in the foregoing embodiment.

The computer system 500 may further perform data communication and exchange data with an external device by using a network adapter 505, a driver adapter 506, and an input/output adapter 507 that are connected to a system bus 504.

In FIG. 5, a specific structure of the controller is described from a perspective of physical hardware. The following describes the specific structure of the controller with reference to FIG. 6 from a perspective of a functional module.

The controller includes a configuration unit 601, a sending unit 602, a receiving unit 603, and a control unit 604.

The configuration unit 601 is configured to: determine characteristic information used to implement a context-aware function, and set the characteristic information in the context-aware model, to create the context-aware model.

The characteristic information includes any one or more of the following: network entity type definition information, network entity function definition information, data attribute definition information, interface definition information, and data threshold information.

The network entity type definition information is used to define a type of a target device from which the context-aware engine collects the target data;

the network entity function definition information is used to define a function of the target device from which the context-aware engine collects the target data;

the data attribute definition information is used to define a data type of the target data collected by the context-aware engine;

the interface definition information is used to define an interface through which the context-aware engine collects the target data; and the data threshold information is used to define a value range of the target data collected by the context-aware engine.

The sending unit 602 is configured to send the created context-aware model to the context-aware engine, where the context-aware model is used to define preset control performed when target data meets a trigger condition, and the preset control is used to implement the context-aware function; and the context-aware model is further used to instruct the context-aware engine to send indication information to the controller when the context-aware engine determines that the target data meets the trigger condition, where the indication information is used to indicate that the target data meets the trigger condition.

The receiving unit 603 is configured to receive the indication information.

The control unit 604 is configured to perform the preset control based on the indication information.

Figure 6:
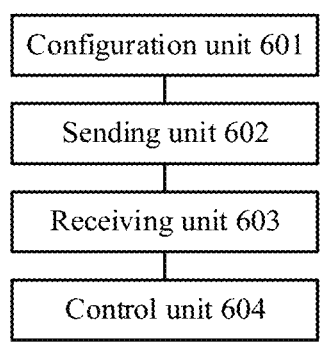
FIG. 6 is an example of a structural diagram of a controller according to one or more embodiments.

For a specific execution process of performing the control method by the controller shown in FIG. 6, refer to FIG. 3. Details are not described again.

Figure 7:
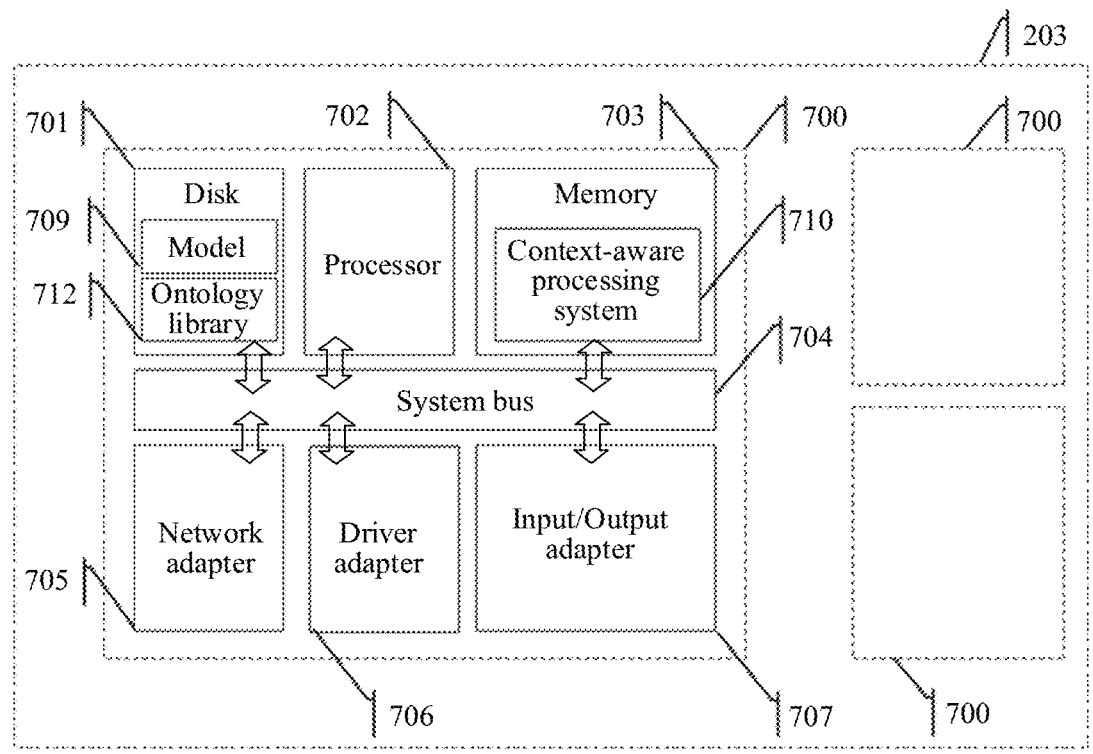
FIG. 7 is an example of a structural diagram of a context-aware engine according to one or more embodiments.

With reference to FIG. 7, the following describes in detail a specific structure of the context-aware engine in this embodiment. FIG. 7 is a schematic structural diagram of hardware of an embodiment of the context-aware engine according to one or more embodiments.

The context-aware engine in this embodiment can implement the control method shown in FIG. 3. For a specific execution process, refer to FIG. 3. Details are not described again.

The context-aware engine 203 is a core component of a development program or system on an electronic platform. By using the context-aware engine 203, a developer may quickly establish and lay out a function required by a program, or assist in running of a program.

The context-aware engine 203 communicates with the network service devices 206, the wireless sensor 208, and the like by using the interconnection network 204.

The context-aware engine 203 in this embodiment is a data processing device including a computer system 700.

For specific descriptions of a disk 701, a context-aware model 709, a processor 702, a memory 703, a system bus 704, a network adapter 705, a driver adapter 706, and an input/output adapter 707 that are included in the context-aware engine 203 in this embodiment, refer to FIG. 5. Details are not described again.

The context-aware engine 203 in this embodiment further includes the memory 703, and the memory 703 is configured to cache model data used to run a context-aware processing system 710 and the context-aware model 709.

In this embodiment, when the context-aware engine 203 runs the context-aware processing system 710, the context-aware engine 203 can implement the control method in the embodiment of FIG. 3. For a specific execution process, refer to FIG. 3. Details are not described again.

The disk 701 in the context-aware engine 203 further includes an ontology library 712. The processor 702 in this embodiment obtains preset data stored in the ontology library 712, to perform the control method shown in FIG. 3, where the preset data stored in the ontology library 712 in this embodiment may vary based on different application scenarios. If the context-aware engine 203 in this embodiment serves in different application scenarios, the ontology library 702 may provide different preset data. For example, the ontology library 712 may provide preset data applied to a financial field, preset data applied to an intelligent control field, preset data applied to a cloud computing field, or the like. This is not specifically limited in this embodiment. For another example, the ontology library 712 may provide different preset data when the context-aware engine 203 serves devices of different models.

With reference to FIG. 3, when this embodiment is applied to an application scenario in which a water heater at a user's home is automatically enabled to heat, the preset data stored in the ontology library 712 may be a time period within which the user is off duty.

Optionally, a type of the ontology library 712 in this embodiment may be a web ontology language (OWL) database, a sensor database, a historical experience database, or the like.

In FIG. 7, a specific structure of the context-aware engine is described from a perspective of physical hardware. The following describes the specific structure of the context-aware engine with reference to FIG. 8 from a perspective of a functional module.

The context-aware engine in this embodiment can implement the control method shown in FIG. 3. For a specific execution process, refer to FIG. 3. Details are not described again.

The context-aware engine includes a receiving unit 801, an obtaining unit 802, a determining unit 803, and a sending unit 804.

The receiving unit 801 is configured to receive a context-aware model sent by a controller, where the context-aware model is used to define preset control performed when target data meets a trigger condition, and the preset control is used to implement a context-aware function; and the context-aware model is further used to instruct the context-aware engine to send indication information to the controller when the context-aware engine determines that the target data meets the trigger condition, where the indication information is used to indicate that the target data meets the trigger condition.

The context-aware model includes characteristic information used to implement the context-aware function.

The characteristic information includes any one or more of the following: network entity type definition information, network entity function definition information, data attribute definition information, interface definition information, and data threshold information.

The network entity type definition information is used to define a type of a target device from which the context-aware engine collects the target data;

the network entity function definition information is used to define a function of the target device from which the context-aware engine collects the target data;

the data attribute definition information is used to define a data type of the target data collected by the context-aware engine;

the interface definition information is used to define an interface through which the context-aware engine collects the target data; and the data threshold information is used to define a value range of the target data collected by the context-aware engine.

The obtaining unit 802 is configured to obtain, based on the context-aware model, the target data defined by the context-aware model.

The determining unit 803 is configured to determine whether the target data meets the trigger condition defined by the context-aware model.

The sending unit 804 is configured to send the indication information to the controller when it is determined that the target data meets the trigger condition defined by the context-aware model.

Figure 8:
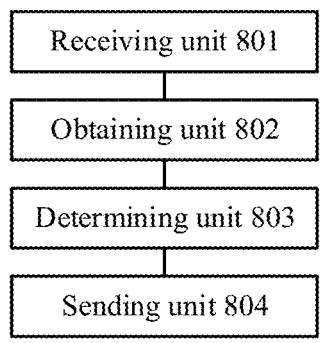
FIG. 8 is an example of a structural diagram of a context-aware engine according to one or more embodiments.

For a specific execution process of performing the control method by the context-aware engine shown in FIG. 8, refer to FIG. 3. Details are not described again.

It may be clearly understood by persons skilled in the art that, for the purpose of convenient and brief description, for a specific working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the discussed embodiments may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions provided in this disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the discussed embodiments. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present invention.

What is claimed is:

1. A control method, comprising:
   determining, by a controller, characteristic information used to implement a context-aware function;
   setting the characteristic information in a context-aware model to create the context-aware model, wherein the characteristic information comprises interface definition information;
   sending, by the controller, the context-aware model to a context-aware engine, wherein the context-aware model is used to define a preset control performed when target data meets a trigger condition and to instruct the context-aware engine to send indication information to the controller when the context-aware engine determines that the target data meets the trigger condition, the preset control is used to implement a context-aware function, and the indication information is used to indicate that the target data meets the trigger condition;
   receiving, by the controller, the indication information; and
   performing, by the controller, the preset control based on the indication information, wherein
   the interface definition information is used to define a wireless communication protocol by which the context-aware engine collects the target data.

2. The method according to claim 1, wherein the characteristic information further comprises one or more of network entity type definition information, network entity function definition information, data attribute definition information, or data threshold information.

3. The method according to claim 2, wherein
   the network entity type definition information is used to define a type of a target device from which the context-aware engine collects the target data,
   the network entity function definition information is used to define a function of the target device from which the context-aware engine collects the target data,
   the data attribute definition information is used to define a data type of the target data collected by the context-aware engine,
   and
   the data threshold information is used to define a value range of the target data collected by the context-aware engine.

4. The method according to claim 1, wherein the wireless communication protocol by which the context-aware engine collects the target data is a wireless-fidelity (Wi-Fi) protocol.

5. A control method, comprising:
   receiving, by a context-aware engine, a context-aware model sent by a controller, wherein the context-aware model is used to instruct the context-aware engine to send indication information to the controller when the context-aware engine determines that target data meets a trigger condition, and the indication information is used to indicate that the target data meets the trigger condition;
   parsing, by the context-aware engine, the context-aware model;
   obtaining characteristic information from the context-aware model, wherein the characteristic information comprises interface definition information;
   collecting, by the context-aware engine, the target data based on the context-aware model;
   generating, by the context-aware engine, the indication information when the context-aware engine determines that the target data meets the trigger condition; and
   sending, by the context-aware engine, the indication information to the controller, wherein
   the interface definition information is used to define a wireless communication protocol by which the context-aware engine collects the target data.

6. The method according to claim 5, wherein a northbound sensor control interface is disposed in the context-aware engine, and the receiving, by the context-aware engine of the context-aware model sent by the controller comprises:
   receiving, by the context-aware engine by using the northbound sensor control interface, the context-aware model sent by the controller.

7. The method according to claim 5,
   wherein the characteristic information further comprises one or more of network entity type definition information, network entity function definition information, data attribute definition information, or data threshold information.

8. The method according to claim 7, wherein the collecting, by the context-aware engine of the target data based on the context-aware model comprises:
   based on a determination that the characteristic information comprises the network entity type definition information, determining, by the context-aware engine based on the network entity type definition information, a target device configured to obtain the target data, wherein a device type of the target device is consistent with a type defined by the network entity type definition information.

9. The method according to claim 7, wherein the collecting, by the context-aware engine of the target data based on the context-aware model comprises:
   based on a determination that the characteristic information comprises the network entity function definition information, determining, by the context-aware engine based on the network entity function definition information, a function of a target device configured to obtain the target data, wherein the function of the target device is consistent with a function defined by the network entity function definition information.

10. The method according to claim 7, wherein the collecting, by the context-aware engine of the target data based on the context-aware model comprises:
    based on a determination that the characteristic information comprises the data attribute definition information, collecting, by the context-aware engine, the target data from a target device based on the data attribute definition information, wherein a data type of the collected target data is consistent with a data type defined by the data attribute definition information.

11. The method according to claim 7, wherein the collecting, by the context-aware engine of the target data based on the context-aware model comprises:
    based on a determination that the characteristic information comprises the data threshold information, collecting, by the context-aware engine, the target data based on the data threshold information, so that a data range of the target data collected by the context-aware engine is consistent with a data range defined by the data threshold information.

12. A context-aware system, comprising a controller and a context-aware engine, wherein
the controller comprises a processor and a memory having instructions stored thereon that, when implemented by the processor, cause the controller to:
determine characteristic information usable to implement a context-aware function;
set the characteristic information in the context-aware model, to create the context-aware model, wherein the characteristic information comprises interface definition information;
send the context-aware model to the context-aware engine, wherein the context-aware model is usable to define a preset control performed when target data meets a trigger condition and to instruct the context-aware engine to send indication information to the controller when the context-aware engine determines that the target data meets the trigger condition, the preset control is usable to implement a context-aware function, and the indication information is used to indicate that the target data meets the trigger condition;
receive the indication information; and
perform the preset control based on the indication information, and
the context-aware engine comprises a processor and a memory having instructions stored thereon that, when implemented by the processor, cause the context-away engine to:
receive the context-aware model and obtain the target data based on the context-aware model;
determine, based on the context-aware model, whether the target data meets the trigger condition; and
send the indication information to the controller when the target data meets the trigger condition,
wherein
the interface definition information is used to define a wireless communication protocol by which the context-aware engine collects the target data.

13. The context-aware system according to claim 12, wherein the characteristic information further comprises one or more of network entity type definition information, network entity function definition information, data attribute definition information, and data threshold information.

14. The context-aware system according to claim 12, wherein a northbound sensor control interface is disposed in the context-aware engine, and the context-aware engine is further caused to:
receive the context-aware model sent by the controller using the northbound sensor control interface.

15. The context-aware system according to claim 13, wherein:
the network entity type definition information is usable to define a type of a target device from which the context-aware engine collects the target data;
the network entity function definition information is usable to define a function of the target device from which the context-aware engine collects the target data;
the data attribute definition information is usable to define a data type of the target data collected by the context-aware engine;
and
the data threshold information is usable to define a value range of the target data collected by the context-aware engine.

16. The context-aware system according to claim 13, the context-aware engine is further caused to:
parse the context-aware model; and
obtain the characteristic information from the context-aware model.

17. The context-aware system according to claim 13, the context-aware engine is further caused to:
based on a determination that the characteristic information comprises the network entity type definition information, determine based on the network entity type definition information, a target device configured to obtain the target data, wherein a device type of the target device is consistent with a type defined by the network entity type definition information.

18. The context-aware system according to claim 13, the context-aware engine is further caused to:
based on a determination that the characteristic information comprises the network entity function definition information, determine based on the network entity function definition information, a function of a target device configured to obtain the target data, wherein the function of the target device is consistent with a function defined by the network entity function definition information.

19. The context-aware system according to claim 13, the context-aware engine is further caused to:
based on a determination that the characteristic information comprises the data attribute definition information, collect the target data from a target device based on the data attribute definition information, wherein a data type of the collected target data is consistent with a data type defined by the data attribute definition information.

20. The context-aware system according to claim 13, the context-aware engine is further caused to:
based on a determination that the characteristic information comprises the data threshold information, collect the target data based on the data threshold information, so that a data range of the target data collected by the context-aware engine is consistent with a data range defined by the data threshold information.

* * * * *